UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

VIOLET ANTHRACENE DYE.

SPECIFICATION forming part of Letters Patent No. 666,594, dated January 22, 1901.

Application filed November 13, 1900. Serial No. 36,351. (No specimens.)

*To all whom it may concern:*

Be it known that I, OSCAR BALLY, doctor of philosophy, a citizen of the Swiss Republic, residing at Mannheim, in the Grand Duchy of Baden, German Empire, have invented new and useful Improvements in Soluble Dyes of the Anthracene Series, of which the following is a specification.

It is known that if mono-amido-anthraquinone sulfo-acids be treated with hologenizing agents they can be converted into halogen derivatives. I have found that upon treating these halogen mono-amido-anthraquinone sulfo-acids with aromatic amins coloring-matters are directly obtained which are soluble in water and which dye chrome mordanted or unmordanted wool, giving violet to blue shades. The process whereby I obtain my new coloring-matters consists in heating a halogenized amido-anthraquinone sulfo-acid, or a salt thereof, with an aromatic amin until no further increase in the quantity of coloring-matter formed takes place. After the melt obtained is cooled it is treated with benzene, ether, alcohol, or a similar solvent, which will dissolve the excess of the amin used, but leaves the coloring-matter undissolved. This residue is collected and constitutes the finished coloring-matter. If desired, it can be purified by dissolving and reprecipitating.

The following example will serve to further illustrate the nature of the invention. The parts are by weight.

Example: Mix together ten (10) parts of brom-alpha-amido-anthraquinone monosulfo-acid (obtained by treating alpha-amido-anthraquinone sulfo-acid with bromin) and one hundred (100) parts of paratoluidin. Heat the mixture so that it boils and maintain the heat until the melt, which is at first red, but later turns violet, shows no increase in the intensity of the color. Allow to cool, and extract the melt with ether until no more paratoluidin dissolves in the ether. The insoluble residue is the new coloring-matter.

Instead of the brominated alpha-amido-anthraquinone-monosulfo-acid the corresponding beta derivative can be employed or a mixture of the alpha and beta derivatives. Also, instead of paratoluidin, anilin or other primary aromatic amin can be used and similar coloring-matter obtained.

The new coloring-matters that I desire to claim are characterized by the following properties: They are soluble in water, giving a blue to violet-blue solution. They dye chrome mordanted or unmordanted wool, giving violet to blue shades. They are soluble in a dilute solution of carbonate of soda or caustic soda, but insoluble in a solution containing an excess of these reagents. The specific coloring-matter from brom-alpha-amido-anthraquinone sulfo-acid and paratoluidin possesses all the above-described properties and is further characterized by yielding a blue-violet solution in alcohol and a brown solution in concentrated sulfuric acid.

Now what I claim is—

1. As an article of manufacture a coloring-matter that can be obtained by heating a halogenized amido-anthraquinone sulfo-acid with an aromatic amin and which is soluble in water giving a blue to violet-blue solution which dies chrome mordanted or unmordanted wool giving violet to blue shades, soluble in a dilute solution of carbonate of soda and of caustic soda but insoluble in a solution containing an excess of either of these reagents all substantially as described.

2. As an article of manufacture a new coloring-matter which can be obtained by heating together brom-alpha-amido-anthraquinone monosulfo-acid and paratoluidin and which is soluble in water giving a blue solution and which dyes chrome mordanted or unmordanted wool violet and is soluble in a solution of carbonate of soda and of caustic soda but insoluble in a solution containing an excess of either of these reagents and gives a blue-violet solution in alcohol and a brown solution in concentrated sulfuric acid substantially as described.

In testimony whereof I have hereunto set my hand in the presence of two subscribing witnesses.

OSCAR BALLY.

Witnesses:
JOHN L. HEINKE,
JACOB ADRIAN.